United States Patent
Fujishima et al.

(10) Patent No.: US 11,173,662 B2
(45) Date of Patent: Nov. 16, 2021

(54) ADDITIVE-MANUFACTURING HEAD, MANUFACTURING MACHINE, AND MANUFACTURING METHOD

(71) Applicant: DMG MORI CO., LTD., Yamatokoriyama (JP)

(72) Inventors: Makoto Fujishima, Yamatokoriyama (JP); Edvard Govekar, Yamatokoriyama (JP); Gideon N. Levy, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 430 days.

(21) Appl. No.: 15/554,063

(22) PCT Filed: Dec. 28, 2015

(86) PCT No.: PCT/JP2015/086481
§ 371 (c)(1),
(2) Date: Aug. 28, 2017

(87) PCT Pub. No.: WO2017/115406
PCT Pub. Date: Jul. 6, 2017

(65) Prior Publication Data
US 2018/0036948 A1    Feb. 8, 2018

(51) Int. Cl.
| | |
|---|---|
| B29C 64/268 | (2017.01) |
| B29C 64/264 | (2017.01) |
| B23K 26/14 | (2014.01) |
| B23K 26/144 | (2014.01) |
| B33Y 10/00 | (2015.01) |
| B33Y 30/00 | (2015.01) |

(Continued)

(52) U.S. Cl.
CPC ........ *B29C 64/268* (2017.08); *B23K 26/0734* (2013.01); *B23K 26/144* (2015.10);
(Continued)

(58) Field of Classification Search
CPC ...... B29C 64/153; B29C 64/20; B29C 64/209
See application file for complete search history.

(56) References Cited

U.S. PATENT DOCUMENTS 4,794,222 A * 12/1988 Funayama ........... B23K 26/048
                                                      219/121.74
5,837,960 A * 11/1998 Lewis .................... B23K 26/34
                                                      219/121.63

(Continued)

FOREIGN PATENT DOCUMENTS

| DE | 10 2007 018 400 A1 | 10/2008 |
|---|---|---|
| JP | 57-102267 A | 6/1982 |

(Continued)

OTHER PUBLICATIONS

International Search Report dated Feb. 16, 2016 in PCT/JP2015/086481 filed Dec. 28, 2015.

*Primary Examiner* — Monica A Huson
*Assistant Examiner* — Kelsey C Grace
(74) *Attorney, Agent, or Firm* — Oblon, McClelland, Maier & Neustadt, L.L.P.

(57) ABSTRACT

An additive-manufacturing head is used for performing additive manufacturing by feeding a material to a workpiece and irradiating the workpiece with a laser beam. The additive-manufacturing head includes: a ring-shape laser beam forming unit configured to form a laser beam in a ring shape; a laser beam emitting unit configured to emit the ring-shape laser beam toward a workpiece; and a material feeding unit having an outlet which is disposed inside the ring-shape laser beam emitted from the laser beam emitting unit and from which the material is released, and configured to feed the material from the outlet toward the workpiece. The head configured in this manner can improve the material usage efficiency for the directed energy deposition method.

7 Claims, 6 Drawing Sheets

(51) Int. Cl.
*B33Y 40/00* (2020.01)
*B23K 26/342* (2014.01)
*B29C 64/153* (2017.01)
*B29C 64/209* (2017.01)
*B23K 26/073* (2006.01)

(52) U.S. Cl.
CPC ........ *B23K 26/1476* (2013.01); *B23K 26/342* (2015.10); *B29C 64/153* (2017.08); *B29C 64/209* (2017.08); *B29C 64/264* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2003/0116542 A1* | 6/2003 | McGregor | B23K 26/0604 219/121.64 |
| 2009/0294412 A1 | 12/2009 | Kono | |
| 2014/0178593 A1* | 6/2014 | Ren | C23C 4/10 427/450 |
| 2017/0017067 A1 | 1/2017 | Ohno et al. | |

FOREIGN PATENT DOCUMENTS

| | | |
|---|---|---|
| JP | 62-177107 A | 8/1987 |
| JP | 2-59192 A | 2/1990 |
| JP | 5-208258 A | 8/1993 |
| JP | 2003-251480 A | 9/2003 |
| JP | 2004-322183 A | 11/2004 |
| JP | 2008-134468 A | 6/2008 |
| JP | 2008-260035 A | 10/2008 |
| JP | 2009-186936 A | 8/2009 |
| JP | 2009-259860 A | 11/2009 |
| JP | 2012-115854 A | 6/2012 |
| JP | 2012-224919 A | 11/2012 |
| WO | WO 2011/082582 A1 | 7/2011 |
| WO | WO 2015/127272 A1 | 8/2015 |
| WO | WO 2015/141031 A1 | 9/2015 |

* cited by examiner

ADDITIVE-MANUFACTURING HEAD, MANUFACTURING MACHINE, AND MANUFACTURING METHOD

TECHNICAL FIELD

The present invention relates to an additive-manufacturing head, a manufacturing machine, and a manufacturing method.

BACKGROUND ART

As a conventional apparatus for implementing additive manufacturing, a laser processing apparatus aiming to perform processing with a high processing quality is disclosed for example in Japanese Patent Laying-Open No. 2009-259860 (PTD 1).

The laser processing apparatus disclosed in PTD 1 includes: a laser source emitting a laser beam; a holding table holding a workpiece to be processed; an optical system generating a laser beam having a ring-band-shaped cross section from the laser beam emitted from the laser source, and applying the laser beam with a variable radius to the workpiece held on the holding table; and a controller configured to change the width of the output of the laser source or the ring-band-shaped laser beam, in a direction of suppressing a change of the peak intensity in the same orientation of the ring-band-shaped laser beam, when the radius of the ring-band-shaped laser beam is changed.

In addition, Japanese Patent Laying-Open No. 2009-186936 (PTD 2), Japanese Patent Laying-Open No. 2008-260035 (PTD 3), Japanese Patent Laying-Open No. 2008-134468 (PTD 4), Japanese Patent Laying-Open No. 2012-115854 (PTD 5), Japanese Patent Laying-Open No. 62-177107 (PTD 6), Japanese Patent Laying-Open No. 57-102267 (PTD 7), and Japanese Patent Laying-Open No. 2004-322183 (PTD 8) also disclose various apparatuses for implementing additive manufacturing.

CITATION LIST

Patent Document

PTD 1: Japanese Patent Laying-Open No. 2009-259860
PTD 2: Japanese Patent Laying-Open No. 2009-186936
PTD 3: Japanese Patent Laying-Open No. 2008-260035
PTD 4: Japanese Patent Laying-Open No. 2008-134468
PTD 5: Japanese Patent Laying-Open No. 2012-115854
PTD 6: Japanese Patent Laying-Open No. 62-177107
PTD 7: Japanese Patent Laying-Open No. 57-102267
PTD 8: Japanese Patent Laying-Open No. 2004-322183

SUMMARY OF INVENTION

Technical Problem

Creation of a three-dimensional form on a workpiece by attaching materials on the workpiece is implemented by a method of additive manufacturing. The mass of the workpiece after additive manufacturing has been increased relative to the workpiece before additive manufacturing. Examples of such an additive manufacturing method include a directed energy deposition method and a powder bed fusion method. In a process of the directed energy deposition method, a material (a typical example is material powder) is fed from an additive-manufacturing head to a workpiece, and the workpiece is irradiated with a laser beam. In a process of the powder bed fusion method, a powder bed is selectively fused and hardened by heat in the vicinity of the surface to form a layer.

Advantages of the directed energy deposition method are as follows:

(a) material powder can be deposited at a higher speed as compared with the powder bed fusion method;

(b) multiple materials in powder form can be deposited at the same time;

(c) a deposited material can be coated by feeding material powder different from a base material;

(d) additive manufacturing can be performed for a large-sized workpiece by moving the additive-manufacturing head in a wide area; and (e) since partial deposition of material powder is possible, the directed energy deposition method can be used for a process of repairing a die, blade, or the like.

On the contrary, disadvantages of the directed energy deposition method are as follows:

(a) the material powder deposition accuracy is inferior to that of the powder bed fusion method; and (b) the combination of laser output, the amount of material powder to be fed, the amount of carrier gas to be fed, and the feed rate, for example, is complicated, which makes it difficult to optimize these parameters.

Regarding the directed energy deposition method, a region near a melt pool, which is formed in a surface of a workpiece by irradiation with a laser beam, is caused to be in an inert gas environment by use of shielding gas, while a machining chamber is in a normal ambient opened to the atmosphere. This is another advantage of the directed energy deposition method, especially for a large manufacturing machine and, unlike the powder bed fusion method, it is unnecessary to fill a completely sealed machining chamber with an expensive gas. The manufacturing machine requires a chip conveyor for discharging chips to the outside of the machine, or the like, and it is difficult for a machining chamber of a large-sized machine to be completely sealed. It is therefore advantageous to develop a manufacturing machine capable of additive manufacturing and subtractive manufacturing based on the directed energy deposition method.

As seen from the above, the directed energy deposition method has many advantages. However, the material powder usage efficiency depends on the combination of process parameters. In the case where the material powder usage efficiency is low, the following problems arise.

(a) Because the material powder is expensive, a device is necessary for collecting the material powder accumulated in the machining chamber. The material powder which is left uncollected is to be discarded.

(b) Maintenance of the machining chamber is difficult. The material powder which enters a mechanism such as a guide can cause a failure in the manufacturing machine.

(c) Material powder such as aluminum requires appropriate treatment.

However, regarding the directed energy deposition method, the combination of process parameters is complicated as described above. In addition, when the material powder is fed from outside the laser beam, it is difficult to prevent scattering of the material powder to the outside of the melt pool. It is therefore extremely difficult to achieve a material powder usage efficiency close to 100%.

Accordingly, an object of the present invention is to solve the above-described problems and provide an additive-manufacturing head, a manufacturing machine, and a manufacturing method that can improve the material powder usage efficiency for the directed energy deposition method.

Solution to Problem

An additive-manufacturing head according to the present invention is an additive-manufacturing head for performing additive manufacturing by feeding a material powder to a workpiece and irradiating the workpiece with a laser beam. The additive-manufacturing head includes: an optical element configured to form a laser beam in a ring shape; a laser beam emitting unit configured to emit the ring-shape laser beam toward a workpiece; and a material feeding unit having an outlet which is disposed inside the ring-shape laser beam emitted from the laser beam emitting unit and from which the material powder is released, and configured to feed the material powder from the outlet toward the workpiece.

Regarding the additive-manufacturing head configured in this manner, the outlet of the material feeding unit is disposed inside the ring-shape laser beam, and therefore, the position from which the material powder is fed toward the workpiece can be disposed close to a region on a workpiece surface that is irradiated with the laser beam. Accordingly, the material powder usage efficiency can be improved.

Preferably, the laser beam emitting unit includes a condenser lens configured to concentrate the ring-shape laser beam emitted toward the workpiece. The material feeding unit penetrates a through hole formed in the condenser lens.

Regarding the additive-manufacturing head configured in this manner, the outlet of the material feeding unit can be disposed inside the ring-shape laser beam in the simple and easy manner.

Preferably, the additive-manufacturing head further includes a guide mirror provided on a central axis of the ring-shape laser beam emitted from the laser beam emitting unit toward the workpiece, the guide mirror being configured to guide the laser beam from the optical element toward the laser beam emitting unit. The material feeding unit penetrates a through hole formed in the guide mirror.

Regarding the additive-manufacturing head configured in this manner, the outlet of the material feeding unit can be disposed inside the ring-shape laser beam in the simple and easy manner.

Preferably, feed of the material powder from the outlet toward the workpiece and emission of the ring-shape laser beam from the laser beam emitting unit toward the workpiece are coaxial.

Regarding the additive-manufacturing head configured in this manner, the outlet of the material feeding unit can be disposed closer to a region on a workpiece surface that is irradiated with the laser beam.

Preferably, the optical element is configured to form the laser beam in a shape of a circular ring, rectangular ring, or triangular ring.

Regarding the additive-manufacturing head configured in this manner, additive manufacturing is performed by feeding a material powder to a workpiece and irradiating the workpiece with the laser beam in the shape of a circular ring, rectangular ring, or triangular ring.

A manufacturing machine according to the present invention is a manufacturing machine capable of subtractive manufacturing and additive manufacturing for a workpiece. The manufacturing machine includes: an additive-manufacturing head as described above; a work holding unit configured to hold the workpiece; and a tool holding unit configured to hold a tool for subtractive manufacturing for the workpiece.

Regarding the manufacturing machine configured in this manner, the material powder usage efficiency in additive manufacturing by the manufacturing machine can be improved.

A manufacturing method according to the present invention is a manufacturing method for performing additive manufacturing by feeding a material powder to a workpiece and irradiating the workpiece with a laser beam. The manufacturing method includes the steps of: forming a laser-beam-irradiated region on a surface of a workpiece by emitting a laser beam in a ring shape toward the workpiece; and feeding a material powder from inside the ring-shape laser beam which is emitted toward the workpiece, toward a region on the surface of the workpiece, the region including a range located inside an outer circumference of the laser-beam-irradiated region.

Regarding the manufacturing method having the above characteristics, the material powder can be fed toward the workpiece from a position closer to the surface of the workpiece. Accordingly, the material powder usage efficiency can be improved.

Preferably, the laser beam emitted toward the workpiece includes a convergence section and a divergence section in a direction in which the laser beam travels. In the convergence section, the laser beam converges toward a focal position. In the divergence section, the laser beam diverges from the focal position. In the step of forming a laser-beam-irradiated region, the laser beam at the focal position or in the convergence section forms the laser-beam-irradiated region on the surface of the workpiece.

Regarding the manufacturing method having the above characteristics, the material powder can be fed toward the workpiece from a position closer to the surface of the workpiece.

Preferably, the laser beam emitted toward the workpiece includes a convergence section and a divergence section in a direction in which the laser beam travels. In the convergence section, the laser beam converges toward a focal position. In the divergence section, the laser beam diverges from the focal position. In the step of forming a laser-beam-irradiated region, the laser beam in the divergence section forms the laser-beam-irradiated region on the surface of the workpiece.

Regarding the manufacturing method having the above characteristics, the material powder is heated by the laser beam at a position immediately before the surface of the workpiece, and therefore, the material powder is easily attached to the workpiece. Accordingly, the material powder usage efficiency can further be improved.

Preferably, feed of the material powder toward the workpiece and emission of the ring-shape laser beam toward the workpiece are coaxial.

Regarding the manufacturing method having the above characteristics, the material powder can be fed toward the workpiece from a position closer to the surface of the workpiece.

Advantageous Effects of Invention

As described above, according to the present invention, the additive-manufacturing head, the manufacturing machine, and the manufacturing method that can improve the material powder usage efficiency for the directed energy deposition method can be provided.

DESCRIPTION OF EMBODIMENTS

An embodiment of the present invention will be described with reference to the drawings. In the drawings referenced below, the same or corresponding members are denoted by the same numerals.

Figure 1:
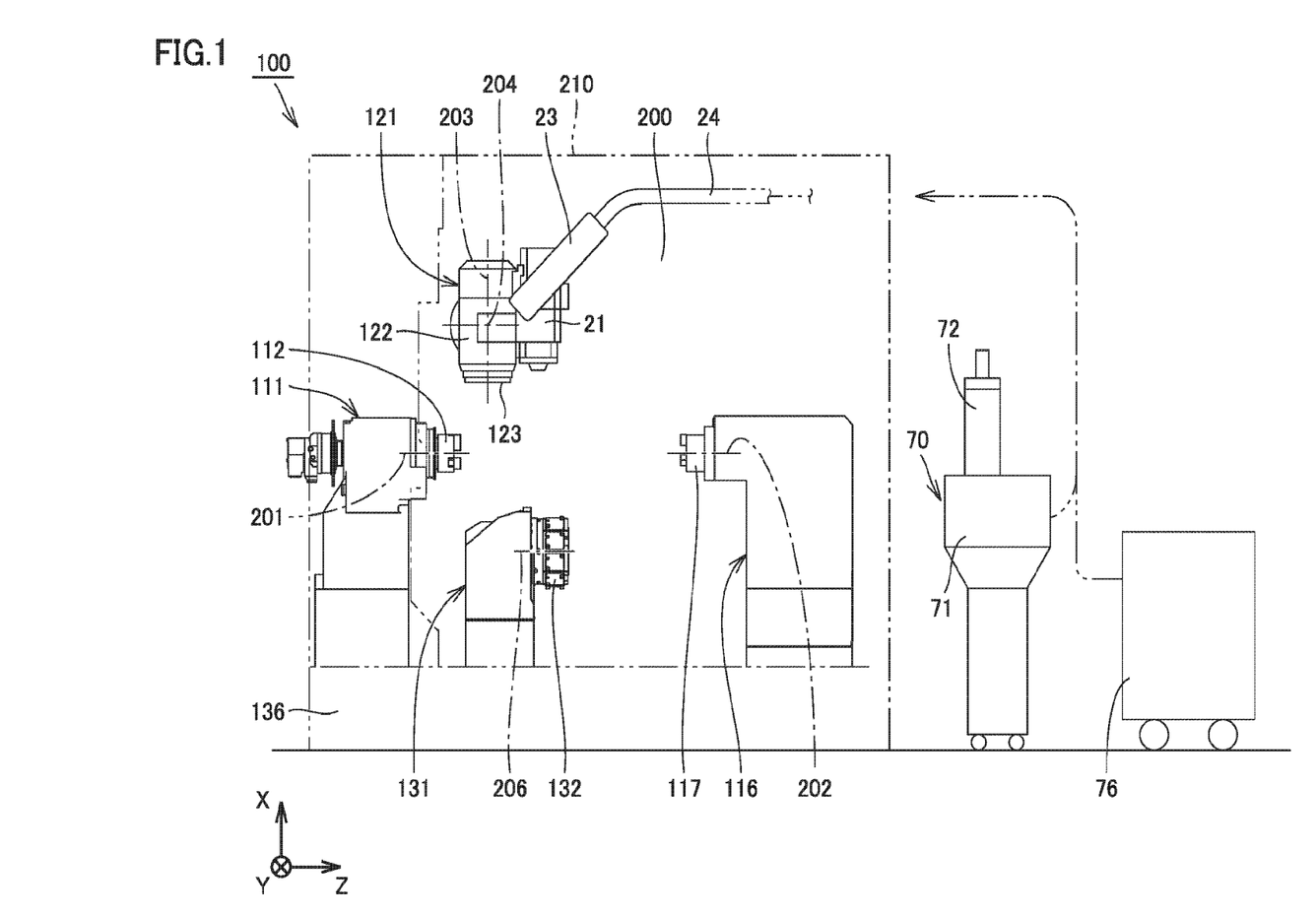
FIG. 1 is a front view showing a manufacturing machine in an embodiment of the present invention.
Figure 2:
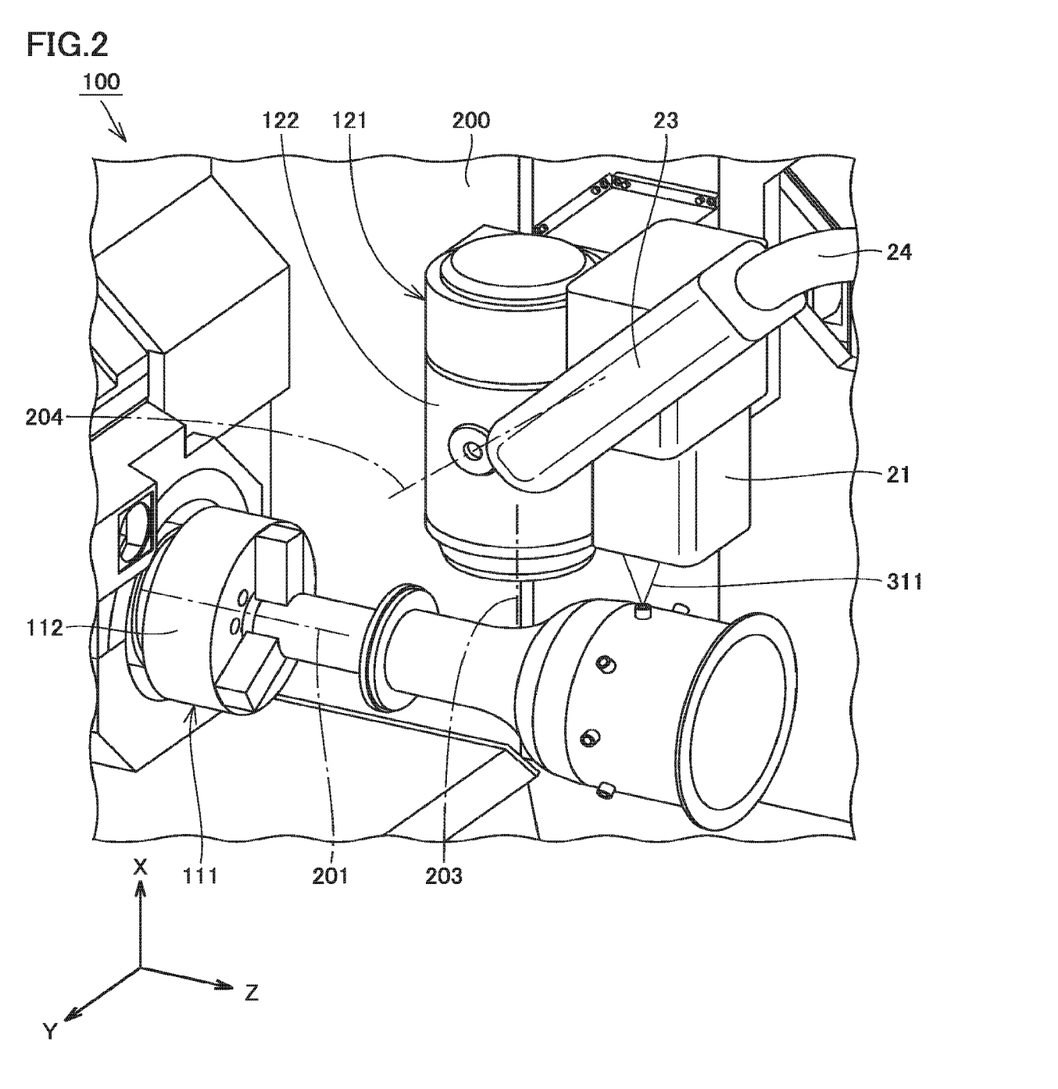
FIG. 2 is a perspective view showing an inside of a machining area when additive manufacturing is performed in the manufacturing machine in FIG. 1.

FIG. 1 is a front view showing a manufacturing machine in an embodiment of the present invention. In FIG. 1, a cover body which presents the appearance of the manufacturing machine is shown as if it is transparent, so that the inside of the manufacturing machine is visible. FIG. 2 is a perspective view showing an inside of a machining area when additive manufacturing is performed in the manufacturing machine in FIG. 1.

Referring to FIGS. 1 and 2, manufacturing machine 100 is an AM/SM hybrid manufacturing machine capable of additive manufacturing (AM) for a workpiece and subtractive manufacturing (SM) for a workpiece. Manufacturing machine 100 has a turning function by means of a stationary tool and a milling function by means of a rotary tool, as functions of SM.

First, a description will be given of the overall structure of manufacturing machine 100. Manufacturing machine 100 includes a bed 136, a first headstock 111, a second headstock 116, a tool spindle 121, and a lower tool rest 131.

Bed 136 is a base member for supporting first headstock 111, second headstock 116, tool spindle 121, and lower tool rest 131, and mounted on an installation surface in a factory or the like. First headstock 111, second headstock 116, tool spindle 121, and lower tool rest 131 are provided in a machining area 200 defined by a splashguard 210.

First headstock 111 and second headstock 116 are provided to face each other in a z-axis direction which extends horizontally. First headstock 111 and second headstock 116 have a first spindle 112 and a second spindle 117, respectively, for rotating a workpiece in a turning process which is performed by means of a stationary tool. First spindle 112 is provided rotatably about a central axis 201 which is in parallel with the z axis. Second spindle 117 is provided rotatably about a central axis 202 which is in parallel with the z axis. First spindle 112 and second spindle 117 are each provided with a chuck mechanism for detachably holding a workpiece.

Second headstock 116 is provided to be movable in the z-axis direction by means of any of various feed mechanisms, guide mechanisms, a servo motor, and the like.

Tool spindle (upper tool rest) 121 causes a rotary tool to rotate in a milling process which is performed by means of the rotary tool. Tool spindle 121 is provided rotatably about a central axis 203 which is in parallel with an x axis extending vertically. Tool spindle 121 is provided with a clamp mechanism for detachably holding the rotary tool.

Tool spindle 121 is supported above bed 136 through a column or the like (not shown). Tool spindle 121 is provided to be movable, by any of various feed mechanisms, guide mechanisms, a servo motor, and the like provided on the column or the like, in the x-axis direction, a y-axis direction which extends horizontally and orthogonally to the z-axis direction, and the z-axis direction. The position of machining by the rotary tool attached to tool spindle 121 moves three-dimensionally. Further, tool spindle 121 is provided to be swivelable about a central axis 204 which is in parallel with the y axis.

Although not shown in FIG. 1, an automatic tool-change device for automatically changing a tool attached to tool spindle 121 and a tool magazine storing replacement tools to be attached tool spindle 121 are provided around first headstock 111.

To lower tool rest 131, a plurality of stationary tools for turning are attached. Lower tool rest 131 has a so-called turret shape, and a plurality of stationary tools are attached radially to lower tool rest 131. Lower tool rest 131 is provided for swivel indexing.

More specifically, lower tool rest 131 includes a swivel unit 132. Swivel unit 132 is provided to be swivelable about a central axis 206 which is in parallel with the z axis. At positions located at intervals in the direction of the circumference centered at central axis 206, tool holders for holding stationary tools are attached. Swivel unit 132 swivels about central axis 206 to thereby move the stationary tools held by the tool holders, and a stationary tool to be used for turning is indexed.

Lower tool rest 131 is supported above bed 136 through a saddle or the like (not shown). Lower tool rest 131 is provided to be movable in the x-axis direction and the z-axis direction, by any of various feed mechanisms, guide mechanisms, a servo motor, and the like provided on the saddle or the like.

Manufacturing machine 100 further includes an additive-manufacturing head 21. Additive-manufacturing head 21 performs additive manufacturing (directed energy deposition) by feeding a material to a workpiece and irradiating the workpiece with a laser beam. In the present embodiment, additive-manufacturing head 21 feeds material powder to a workpiece. As the material powder, stainless, Inconel (registered trademark), or titanium alloy, or the like, for example, may be used.

The form of the material fed to a workpiece by additive-manufacturing head 21 is not limited to powder but may be wire, long slender strip, or the like.

Additive-manufacturing head 21 is provided to be attachable to and detachable from tool spindle 121. When additive manufacturing is performed, additive-manufacturing head 21 is attached to tool spindle 121. Tool spindle 121 moves in the x-axis direction, the y-axis direction, and the z-axis direction to thereby three-dimensionally displace the position of additive manufacturing by additive-manufacturing head 21. When subtractive manufacturing is performed, additive-manufacturing head 21 is separated from tool spindle 121 and stored in a head stocker (not shown).

Tool spindle 121 is provided with a clamp mechanism. When additive-manufacturing head 21 is attached to tool spindle 121, the clamp mechanism operates to couple additive-manufacturing head 21 to tool spindle 121. An example of the clamp mechanism may be a mechanism obtaining a clamping state through a spring force and obtaining an unclamping state through a hydraulic pressure.

Manufacturing machine 100 further includes a powder feeder 70, a laser oscillator 76, and a cable 24.

Powder feeder 70 introduces material powder to be used for additive manufacturing, toward additive-manufacturing head 21 in machining area 200. Powder feeder 70 includes a powder hopper 72 as a tank portion, and a mixing unit 71. Powder hopper 72 forms a closed space for storing material powder to be used for additive manufacturing. Mixing unit 71 mixes the material powder stored in powder hopper 72 with carrier gas for the material powder.

Laser oscillator 76 generates a laser beam to be used for additive manufacturing. Cable 24 is made up of an optical fiber for directing the laser beam from laser oscillator 76 toward additive-manufacturing head 21, pipes for directing material powder from powder feeder 70 toward additive-manufacturing head 21, and a tube member which encloses the pipes.

Figure 3:
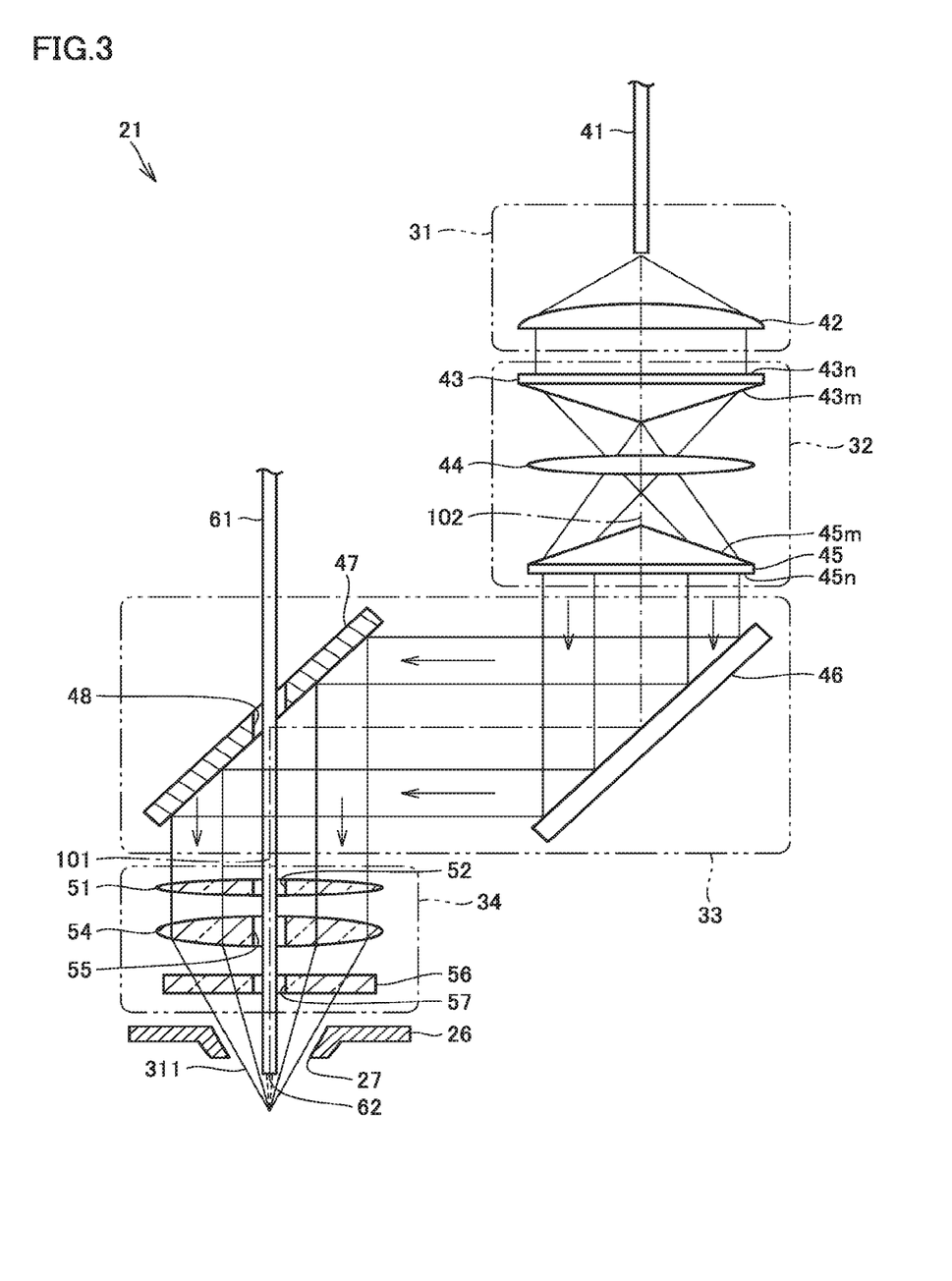
FIG. 3 is a diagram showing an internal structure of an additive-manufacturing head in FIGS. 1 and 2.

Next, a detailed description will be given of a structure of additive-manufacturing head 21. FIG. 3 is a diagram showing an internal structure of the additive-manufacturing head in FIGS. 1 and 2.

Referring to FIG. 3, additive-manufacturing head 21 includes, as optical systems for emitting an externally introduced laser beam toward a workpiece, a laser beam collimating unit 31, a ring-shape laser beam forming unit 32, a laser beam guiding unit 33, and a laser beam emitting unit 34.

Laser beam collimating unit 31, ring-shape laser beam forming unit 32, laser beam guiding unit 33, and laser beam emitting unit 34 are arranged in this order from upstream to downstream of an optical path of the laser beam in additive-manufacturing head 21.

A laser beam from cable 24 (see FIGS. 1 and 2) is introduced through an optical fiber 41 into laser beam collimating unit 31. Laser beam collimating unit 31 includes a collimation lens 42. Collimation lens 42 is provided on a central axis 102. Laser beam collimating unit 31 produces, by means of collimation lens 42, parallel rays from the laser beam which is input from optical fiber 41, and sends the parallel rays toward ring-shape laser beam forming unit 32.

Ring-shape laser beam forming unit 32 includes an axicon lens 43, an axicon lens 45, and a spherical lens 44. Axicon lens 43, spherical lens 44, and axicon lens 45 are arranged in this order from upstream to downstream of the optical path of the laser beam in additive-manufacturing head 21. Axicon lens 43, spherical lens 44, and axicon lens 45 are provided on central axis 102.

Axicon lens 43 has one surface 43m in the shape of a conical surface and the other surface 43n in the shape of a planar surface. Axicon lens 45 has one surface 45m in the shape of a conical surface and the other surface 45n in the shape of a planar surface. Axicon lens 43 and axicon lens 45 are arranged so that one surface 43m of axicon lens 43 faces one surface 45m of axicon lens 45.

Ring-shape laser beam forming unit 32 forms the laser beam which is input from laser beam collimating unit 31 into a ring shape through axicon lens 43, spherical lens 44, and axicon lens 45. The laser beam which is output from ring-shape laser beam forming unit 32 is in the shape of a ring, namely the shape of a closed band around central axis 102 as seen in a cross section along a plane orthogonal to the direction in which the laser beam travels. In the present embodiment, ring-shape laser beam forming unit 32 forms the laser beam input from laser beam collimating unit 31 into a circular ring-shape. The ring-shape laser beam emitted from ring-shape laser beam forming unit 32 is centered on central axis 102 and travels in the axial direction of central axis 102.

Laser beam guiding unit 33 includes a guide mirror 46 and a guide mirror 47. Guide mirror 46 and guide mirror 47 are arranged in this order from upstream to downstream of the optical path of the laser beam in additive-manufacturing head 21. Guide mirror 46 is provided on central axis 102. Guide mirror 46 is provided to be inclined with respect to central axis 102. Guide mirror 47 is provided on a central axis 101 which runs in parallel with central axis 102. Guide mirror 47 is provided to be inclined with respect to central axis 101.

Laser beam guiding unit 33 guides the ring-shape laser beam which is input from ring-shape laser beam forming unit 32 toward laser beam emitting unit 34, through reflection by guide mirror 46 and guide mirror 47. The ring-shape laser beam which is output from laser beam guiding unit 33 is centered on central axis 101 and travels in the axial direction of central axis 101.

Laser beam emitting unit 34 includes a condenser lens 51, a condenser lens 54, and a protective lens 56. Condenser lens 51, condenser lens 54, and protective lens 56 are arranged in this order from upstream to downstream of the optical path of the laser beam in additive-manufacturing head 21. Condenser lens 51, condenser lens 54, and protective lens 56 are provided on central axis 101.

Laser beam emitting unit 34 emits the ring-shape laser beam which is input from laser beam guiding unit 33 toward a workpiece. Laser beam emitting unit 34 concentrates the ring-shape laser beam emitted toward the workpiece, through condenser lens 51 and condenser lens 54. The ring-shape laser beam emitted from laser beam emitting unit 34 is centered on central axis 101 and travels in the axial direction of central axis 101. Protective lens 56 is provided for protecting the lens system installed in additive-manufacturing head 21 from the external ambient.

Additive-manufacturing head 21 includes a material powder feeding unit 61, as a mechanism for feeding material powder to a workpiece.

Material powder feeding unit 61 has a pipe shape capable of delivering material powder. Material powder feeding unit 61 is provided along central axis 101. Material powder is introduced from cable 24 (see FIGS. 1 and 2) into material powder feeding unit 61. Material powder feeding unit 61 has an outlet 62. Outlet 62 is an opening of material powder feeding unit 61 releasing material powder. Material powder feeding unit 61 feeds material powder from outlet 62 toward a workpiece.

Outlet 62 is disposed inside the ring-shape laser beam emitted from laser beam emitting unit 34. Outlet 62 is provided on central axis 101. Feed of the material from outlet 62 toward a workpiece and emission of the ring-shape laser beam from laser beam emitting unit 34 toward the workpiece are coaxial with central axis 101 and coaxial with each other.

Outlet 62 is disposed downstream of condenser lens 51 and condenser lens 54 on the optical path of the laser beam in additive-manufacturing head 21. Outlet 62 is provided downstream of protective lens 56 on the optical path of the laser beam in additive-manufacturing head 21.

A through hole 48 is formed in guide mirror 47. Through hole 48 is formed to be located on central axis 101 and penetrate guide mirror 47. Through hole 48 has an opening larger than a cross section of material powder feeding unit 61 along a plane orthogonal to central axis 101. Material powder feeding unit 61 penetrates through hole 48.

In condenser lens 51, condenser lens 54, and protective lens 56, a through hole 52, a through hole 55, and a through hole 57 are formed, respectively. Through hole 52, through hole 55, and through hole 57 are formed to be provided on central axis 101 and penetrate condenser lens 51, condenser lens 54, and protective lens 56, respectively. Through hole 52, through hole 55, and through hole 57 each have an opening larger than a cross section of material powder feeding unit 61 along a plane orthogonal to central axis 101. Material powder feeding unit 61 penetrates through holes 52, 55, and 57.

Additive-manufacturing head 21 includes a cover body 26. Cover body 26 has the shape of a casing and forms a space which houses condenser lens 51, condenser lens 54, and protective lens 56. An opening 27 is formed in cover body 26. Opening 27 is provided on central axis 101. Opening 27 is located to face a surface of a workpiece during additive manufacturing. Opening 27 allows the space housing condenser lens 51, condenser lens 54, and protective lens 56 to communicate with the external space. The ring-shape laser beam is emitted from laser beam emitting unit 34 to the external space through opening 27.

In the axial direction of central axis 101, outlet 62 is preferably located in the external space, namely located outward with respect to opening 27. In this case, outlet 62 can be disposed closer to a workpiece.

Outlet 62 may be located identically to opening 27 in the axial direction of central axis 101, or provided in cover body 26. As long as outlet 62 is located inside the ring-shape laser beam emitted from laser beam emitting unit 34, the position of outlet 62 is not particularly limited, and may be displaced from central axis 101.

Figure 4:
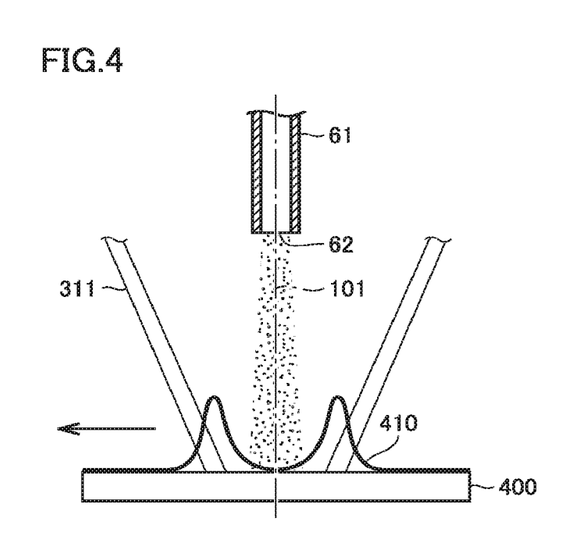
FIG. 4 is a cross-sectional view showing a surface of a workpiece during additive manufacturing based on a manufacturing method in an embodiment of the present invention.
Figure 5:
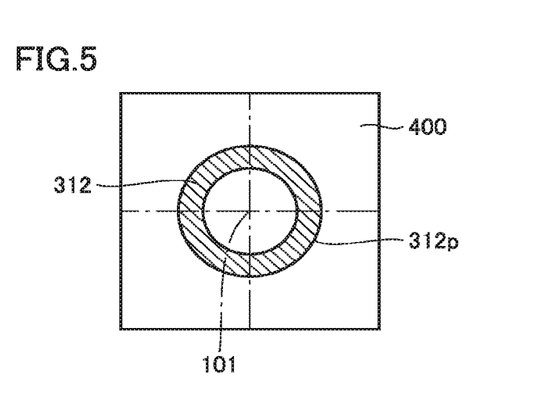
FIG. 5 is a plan view of the surface of the workpiece in FIG. 4.
Figure 6:
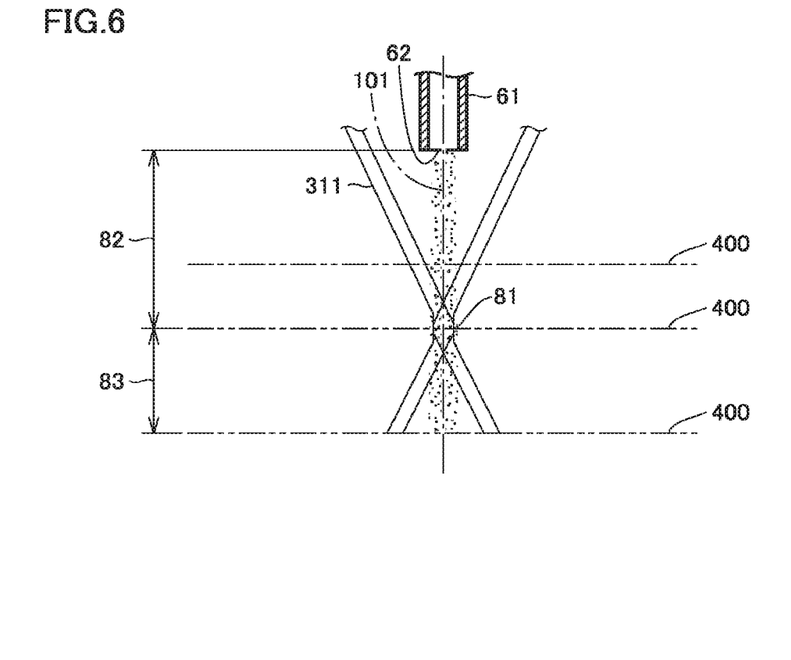
FIG. 6 is a diagram showing a positional relation between a workpiece and a laser beam emitted toward the workpiece.

Next, a description will be given of a manufacturing method in an embodiment of the present invention. FIG. 4 is a cross-sectional view showing a surface of a workpiece during additive manufacturing based on a manufacturing method in the embodiment of the present invention. FIG. 5 is a plan view of the surface of the workpiece in FIG. 4. FIG. 6 is a diagram showing a positional relation between a workpiece and a laser beam emitted toward the workpiece.

Referring to FIGS. 4 to 6, the manufacturing method in the present embodiment is a manufacturing method for performing additive manufacturing by feeding material powder to a workpiece 400 and irradiating workpiece 400 with a laser beam, and includes the steps of: forming a laser-beam-irradiated region 312 on a surface of the workpiece by emitting a laser beam 311 in a ring shape toward workpiece 400; and feeding the material powder from inside ring-shape laser beam 311 which is emitted toward workpiece 400, toward a region on the surface of the workpiece, the region including a range located inside an outer circumference 312p of laser-beam-irradiated region 312.

In the case where manufacturing machine 100 (additive-manufacturing head 21) in FIGS. 1 to 3 is used to perform additive manufacturing, ring-shape laser beam 311 is emitted from laser beam emitting unit 34 toward workpiece 400 to thereby form laser-beam-irradiated region 312 on a surface of the workpiece. The material powder is released from outlet 62 of material powder feeding unit 61 to thereby feed, from inside ring-shape laser beam 311 which is emitted toward workpiece 400, the material powder to a region on the workpiece surface, the region including the range located inside outer circumference 312p of laser-beam-irradiated region 312.

Movement of tool spindle 121 to which additive-manufacturing head 21 is attached and/or rotation of first spindle 112 of first headstock 111 which holds workpiece 400 cause additive-manufacturing head 21 and workpiece 400 to move relative to each other with additive-manufacturing head 21 facing workpiece 400. At this time, the step of emitting ring-shape laser beam 311 toward workpiece 400 and the step of feeding the material powder toward the workpiece surface are simultaneously performed to thereby melt and attach the material powder to the workpiece surface.

A curved line 410 in FIG. 4 represents a normalized laser beam density distribution on the workpiece surface.

As shown in FIG. 6, laser beam 311 emitted toward workpiece 400 includes a convergence section 82 and a divergence section 83 in the direction in which the laser beam travels. In the convergence section, the laser beam converges toward a focal position 81. In the divergence section, the laser beam diverges from focal position 81.

In the present embodiment, as shown in FIGS. 4 and 5, laser beam 311 in convergence section 82 forms laser-beam-irradiated region 312 on the workpiece surface. In this case, laser-beam-irradiated region 312 has the shape of a closed band around central axis 101. Laser-beam-irradiated region 312 has the shape of a circular closed band around central axis 101 that corresponds to the shape of the laser beam (circular ring-shape) emitted from laser beam emitting unit 34 toward workpiece 400. Outer circumference 312p of laser-beam-irradiated region 312 has the shape of a circle centered on central axis 101.

Feed of the material powder toward workpiece 400 and emission of the ring-shape laser beam toward workpiece 400 are coaxial with central axis 101 and coaxial with each other. In the step of feeding the material powder toward the workpiece surface, the material powder is fed toward a region which is centered on central axis 101 on the workpiece surface and which is located inside laser-beam-irradiated region 312.

Regarding manufacturing machine 100, additive-manufacturing head 21, and the manufacturing method in the embodiment of the present invention as described above, the position (outlet 62) from which the material powder is released toward a workpiece can be made closer to the region on the workpiece surface irradiated with the laser beam. Accordingly, the material powder is less likely to scatter and the efficiency of usage of the material powder can be improved.

In the present embodiment, laser beam 311 in convergence section 82 forms laser-beam-irradiated region 312 on the workpiece surface. Alternatively, laser beam 311 at focal position 81 may form the laser-beam-irradiated region. At this time, the laser-beam-irradiated region has a circular shape. In the case where laser beam 311 in convergence section 82 or at focal position 81 forms the laser-beam-irradiated region, the position (outlet 62) from which the material powder is released toward the workpiece can be made closer to the region on the workpiece surface irradiated with the laser beam.

Still alternatively, laser beam 311 in divergence section 83 may form the laser-beam-irradiated region. At this time, the laser-beam-irradiated region has the shape of a circular closed band around central axis 101. In this case, the material powder is heated (preheated) by the laser beam at a position preceding and at a position following focal position 81. Thus, the material powder is more easily melt and attached to the workpiece surface.

Figure 7:
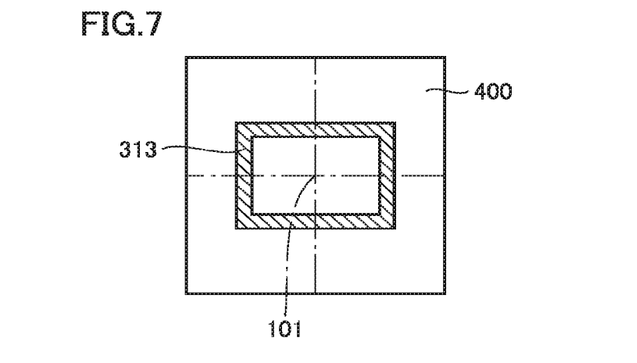
FIG. 7 is a plan view of a surface of a workpiece illustrating a first modification of a laser-beam-irradiated region in FIG. 5.
Figure 8:
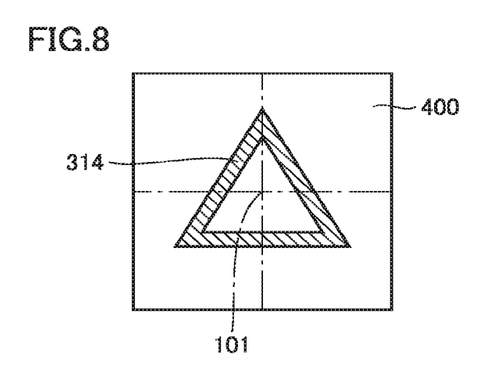
FIG. 8 is a plan view of a surface of a workpiece illustrating a second modification of a laser-beam-irradiated region in FIG. 5.

FIGS. 7 and 8 are each a plan view of a workpiece surface illustrating a modification of the laser-beam-irradiated region in FIG. 5. Referring to FIG. 7, a laser-beam-irradiated region 313 in the present modification has the shape of a rectangular closed band around central axis 101. In this case, ring-shape laser beam forming unit 32 of additive-manufacturing head 21 forms the laser beam in the shape of a rectangular ring.

Referring to FIG. 8, a laser-beam-irradiated region 314 in the present modification has the shape of a triangular closed band around central axis 101. In this case, ring-shape laser beam forming unit 32 of additive-manufacturing head 21 forms the laser beam in the shape of a triangular ring.

As illustrated in connection with these modifications, the shape of the laser beam emitted toward a workpiece is not particularly limited, as long as the shape of the laser beam is a ring shape. Any of various prisms can be used in ring-shape laser beam forming unit 32 to form the laser beam in any of various ring shapes.

Figure 9:
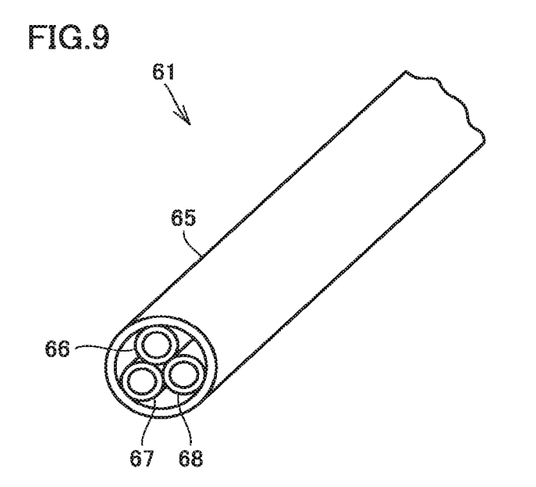
FIG. 9 is a perspective view illustrating a modification of a material powder feeding pipe in FIG. 3.

FIG. 9 is a perspective view illustrating a modification of the material powder feeding pipe in FIG. 3. Referring to FIG. 9, in the present modification, material powder feeding unit 61 includes a plurality of tube members 66, 67, 68, and an outer tube 65. Tube member 66, tube member 67, and tube member 68 are enclosed in outer tube 65. Into tube member 66, tube member 67, and tube member 68, materials in the powder form that are different from one another are introduced, respectively. This characteristic enables a mixture of multiple different materials in the powder form to be fed to a workpiece.

The number of tube members of material powder feeding unit 61 is not limited to three. The number of tube members may be two, or four or more.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is mainly applied to additive manufacturing based on the directed energy deposition method.

REFERENCE SIGNS LIST 21 additive-manufacturing head; 24 cable; 26 cover body; 27 opening; 31 laser beam collimating unit; 32 ring-shape laser beam forming unit; 33 laser beam guiding unit; 34 laser beam emitting unit; 41 optical fiber; 42 collimation lens; 43, 45 axicon lens; 43m, 45m one surface; 43n, 45n the other surface; 44 spherical lens; 46, 47 guide mirror; 48, 52, 55, 57 through hole; 51, 54 condenser lens; 56 protective lens; 61 material powder feeding pipe; 62 outlet; 65 outer tube; 66, 67, 68 tube member; 70 powder feeder; 71 mixing unit; 72 powder hopper; 76 laser oscillator; 81 focal position; 82 convergence section; 83 divergence section; 100 manufacturing machine; 101, 102, 201, 202, 203, 204, 206 central axis; 111 first headstock; 112 first spindle; 116 second headstock; 117 second spindle; 121 tool spindle; 131 tool rest; 132 swivel unit; 136 bed; 200 machining area; 210 splash guard; 311 laser beam; 312, 313, 314 laser-beam-irradiated region; 312p outer circumference; 400 workpiece; 410 curved line

The invention claimed is:

1. An additive-manufacturing head for performing additive manufacturing by feeding a material powder to a workpiece and irradiating the workpiece with a laser beam, the additive-manufacturing head comprising:
   an optical element configured to form a laser beam in a ring shape;
   a laser beam emitting unit configured to emit the ring-shape laser beam toward a workpiece; and
   a material feeding unit having an outlet which is disposed inside the ring-shape laser beam emitted from the laser beam emitting unit and from which the material powder is released, and configured to feed the material powder from the outlet toward the workpiece,
   wherein the material feeding unit includes a pipe shape capable of delivering the material powder,
   wherein the laser beam emitting unit includes a condenser lens configured to concentrate the ring-shape laser beam emitted toward the workpiece,
   wherein the material feeding unit penetrates a through hole formed in the condenser lens,
   wherein the additive-manufacturing head further comprises a cover body forming an interior space which houses the laser beam emitting unit, an opening being formed in the cover body and located to face a surface of the workpiece during the additive manufacturing,
   wherein the material feeding unit protrudes from the interior space to an external space through the opening, the external space being outside of the cover body, and
   wherein the outlet is located in the external space outside of the cover body.

2. The additive-manufacturing head according to claim 1, further comprising a guide mirror provided on a central axis of the ring-shape laser beam emitted from the laser beam emitting unit toward the workpiece, the guide mirror being configured to guide the laser beam from the optical element toward the laser beam emitting unit, wherein
   the material feeding unit penetrates a through hole formed in the guide mirror.

3. The additive-manufacturing head according to claim 1, wherein feed of the material powder from the outlet toward the workpiece and emission of the ring-shape laser beam from the laser beam emitting unit toward the workpiece are coaxial.

4. The additive-manufacturing head according to claim 1, wherein the optical element is configured to form the laser beam in a shape of a circular ring, rectangular ring, or triangular ring.

5. The additive-manufacturing head according to claim 1, wherein the material feeding unit includes a plurality of tube members configured to feed respective different types of the material powder.

6. A manufacturing machine capable of subtractive manufacturing and additive manufacturing for a workpiece, comprising:
   an additive-manufacturing head as recited in claim 1;
   a work holding unit configured to hold the workpiece; and
   a tool holding unit configured to hold a tool for subtractive manufacturing for the workpiece.

7. The additive-manufacturing head according to claim 1, wherein laser beam emitting unit includes a protective lens disposed downstream of the condenser lens in an optical path of the laser beam.

* * * * *